(12) United States Patent
Oguchi et al.

(10) Patent No.: US 7,915,326 B2
(45) Date of Patent: Mar. 29, 2011

(54) PRINTING INK COMPOSITION

(75) Inventors: Toshihiko Oguchi, Koza-gun (JP); Shozo Murata, Koza-gun (JP)

(73) Assignee: Morimura Chemicals Ltd., Koza-gun (JP)

( * ) Notice: Subject to any disclaimer, the term of this patent is extended or adjusted under 35 U.S.C. 154(b) by 805 days.

(21) Appl. No.: 11/721,736

(22) PCT Filed: Dec. 14, 2005

(86) PCT No.: PCT/JP2005/022973
§ 371 (c)(1),
(2), (4) Date: Jun. 14, 2007

(87) PCT Pub. No.: WO2006/064854
PCT Pub. Date: Jun. 22, 2006

(65) Prior Publication Data
US 2009/0252966 A1    Oct. 8, 2009

(30) Foreign Application Priority Data

Dec. 14, 2004    (JP) .................. P2004-361868

(51) Int. Cl.
*C09D 11/00*    (2006.01)
(52) U.S. Cl. ......... 523/160; 523/161; 524/407; 524/277
(58) Field of Classification Search .......... 523/160, 523/161
See application file for complete search history.

(56) References Cited

U.S. PATENT DOCUMENTS

| | | | | |
|---|---|---|---|---|
| 5,643,984 A | * | 7/1997 | Mueller et al. | 524/272 |
| 2005/0049330 A1 | * | 3/2005 | McFaddin | 523/223 |

FOREIGN PATENT DOCUMENTS

| | | | |
|---|---|---|---|
| EP | 0 595 273 | A1 | 5/1994 |
| EP | 1 167 056 | A1 | 1/2002 |
| JP | 63-202671 | | 8/1988 |
| JP | 2 137715 | | 5/1990 |
| JP | 02-137715 | * | 5/1990 |
| JP | 10 140069 | | 5/1998 |
| JP | 2000 178493 | | 6/2000 |
| JP | 2001 342392 | | 12/2001 |

OTHER PUBLICATIONS

Derwent Abstract of JP 02-137715, Hattori et al, Dec. 1997.*
Human translation of Hattori (JP 02-137715).*
"Japanese Industrial Standard Petroleum waxes JIS K 2235" Translated and Published by Japanese Standards Association, pp. 1-26, 1991.

* cited by examiner

*Primary Examiner* — Vasu Jagannathan
*Assistant Examiner* — Doris L Lee
(74) *Attorney, Agent, or Firm* — Oblon, Spivak, McClelland, Maier & Neustadt, L.L.P.

(57) ABSTRACT

A printing ink composition that not only exerts an excellent anti-blocking effect but also is free from any hickey phenomenon, resolving the problems of form plate stain, blanket stain, etc. There are provided a printing ink composition wherein there are dispersed composite particles having a volume-average particle diameter of 2 to 8 μm in which the volume content of solid polymer particles having a particle diameter of larger than 10 μm is not larger than 5 vol. % or less. Each of the composite particles (A) comprises a solid polymer particle (B), such as wax, insoluble in the printing ink, and inorganic microparticles (C) mainly adhered to the periphery of the solid polymer particle (B) and having an average particle diameter of 5 to 1000 nm.

10 Claims, No Drawings

PRINTING INK COMPOSITION

TECHNICAL FIELD

The present invention relates to a printing ink composition, and more particularly to a printing ink composition suitable for a printing ink for an offset rotary press.

BACKGROUND ART

It is general that the printing surface of a printed material is rubbed in contact with such as guide rolls, turn bars, a former or the back surface of another printed material immediately after printing. The rubbing causes on the printed surface a so-called blocking phenomenon that the printed ink composition is fused to adhere to the surface of the contacted substance to considerably deteriorate the quality of the printed surface and also causes a problem to contaminate the contacted surface of the other substance.

To improve the abrasion resistance of the printed surface, microparticles of solid polymer such as resin or wax are added into the printing ink to form fine projections which provide the printed surface with smoothness.

The printing ink on the printed surface generally has a thickness of about 0.2 to 1.0 µm, so that the solid polymer particles for forming fine projections on the printed surface are adjusted to have a particle diameter in a range of 1 µm or more. It is because if the solid polymer particles have a particle diameter of less than 1 µm, the solid polymer particles are buried into the printed ink layer and do not act as a lubricant, and if the solid polymer particles have an excessively large particle diameter, the particles remain on the inking roll, the form plate or the blanket when printing to gradually accumulate or pile to deteriorate the printed image quality or aggregate on the form plate to form projections, and a so-called hickey phenomenon that the projected portions form non-print spots is caused.

But, it is hard to adjust the solid polymer particles to a desired grain size range and to disperse stably into an ink, and the problems of form plate stain, blanket stain and the like resulting from the inclusion of particles having a large particle diameter has not been solved completely yet.

When printing at a high speed, there is caused so-called misting that solid polymer particles are separated to get scattered when the ink is transferred from the form plate. This problem occurs because the solid polymer particles are low in affinity with an ink vehicle. To prevent it, it is necessary to modify the surfaces of the dispersed particles into the boundary surface having an affinity with the vehicle.

The high-speed offset printing exposes the printed material to a high temperature for drying, but if the paper surface temperature becomes 100° C. or more, the solid polymer particles projected from the surfaces are melted to make the surface flat, and the surface smoothness is lost. Therefore, the solid polymer particles having a high melting point are added to form fine projections on the printed surface in these years, but it is hard to make the average particle diameter of the solid polymer particles having a high melting point fine to about 1 to 10 µm.

In addition, slip properties between the printed surface and the back surface of the printed material and also its slip properties against the surface of another member are required, but the friction coefficient of the surface is rarely degraded considerably by wax or the like present as projections on the printed surface, and it becomes difficult to pile up the printed materials. In such a case, inorganic powder having an appropriate particle diameter is added into the printing ink to increase the friction coefficient, but there is a problem that the addition of the inorganic powder degrades the transparency and glossiness of the printed surface.

DISCLOSURE OF THE INVENTION

The present invention has been made to solve the existing problems and provides a printing ink composition having the following conventional problems of a printing ink solved.

(1) Provision of a printing ink composition that no only exerts an excellent abrasion resistance and an excellent anti-blocking effect but also is free from a hickey phenomenon, resolving the problems of form plate stain, blanket stain, etc.

(2) Provision of a printing ink composition that the solid polymer particles having a high melting point are made fine in size and added, and the slip properties with the guide rolls to which the printed surface is contacted and the back surface are controlled when printing to produce a printed material free from a form plate stain or a blanket stain.

(3) Provision of a printing ink composition that does not deteriorate the surface glossiness and transparency of a printing ink containing a solid polymer component for satisfying printability such as a viscoelastic property.

(4) Provision of a printing ink which contains a solid polymer component exhibiting abrasion resistance and having an excellent anti-blocking effect, wherein the abrasion resistance and the blocking property are not degraded even after a process of fixing the printed surface under a high temperature.

(5) Provision of an aqueous printing ink which contains a solid polymer component exhibiting abrasion resistance and having an excellent anti-blocking effect for an aqueous flexographic or gravure printing ink.

The printing ink composition according to an aspect of the invention is a printing ink composition which is used in a printing ink, the printing ink composition comprising composite particles (A), wherein each of the composite particles (A) comprises: a solid polymer particle (B) formed of a resin, wax or a mixture thereof insoluble in the printing ink; and inorganic particles (C) having an average particle diameter of 5 to 1000 nm; wherein the composite particles (A) have a volume-average particle diameter in a range of 2 to 8 µm in which a volume content of solid polymer particles having a particle diameter of exceeding 10 µm is 5 vol. % or less; and wherein each of the composite particles (A) is formed to cover substantially the surfaces of the solid polymer particle (B) with the inorganic microparticles (C).

The composite particles (A) used in the present invention generally have the inorganic microparticles (C) adhered or partly buried so to cover substantially the surfaces of the solid polymer particles (B), and they have a volume-average particle diameter in a range of 2 to 8 µm. The "volume-average particle diameter" in the specification is a volume-average particle diameter value of particles determined from the number and grain size distribution obtained directly from a photomicrograph or by measuring by an image analyzer, in case that the volume-average particle diameter is a particle diameter of 0.5 µm or below, and a volume-average particle diameter value of particles measured by a Coulter counter produced by Beckman Coulter K.K., in case that the volume-average particle diameter is a particle diameter of 0.5 µm or more. If the composite particles (A) contained in the printing ink composition have a volume-average particle diameter of less than 2 µm, it is not desirable because they do not act as active ingredients for provision of abrasion resistance and blocking property which is an originally intended object of the present invention. If the volume-average particle diameter exceeds 8 µm, it is effective for improvement of the abrasion resistance and blocking property, but it is not desirable because piling occurs on the form plate, the blanket or the inking roll to cause a form plate stain or the like, and glossiness and transparency are deteriorated. Even if the volume-average part ice diameter is 8 µm or less, particles containing more than 5 vol. % of particles having a particle diameter of exceeding 10 µm due to a large grain size distribution are not desirable because piling tends to occur.

Examples of the solid polymer particles (B) used in the invention include resin particles of such as fluorocarbon resin, polystyrene, polyacetal, epoxy resin or silicone resin, and particles having a volume-average particle diameter of 0.1 to 30 µm and comprising wax such as natural wax, synthetic wax, polyethylene wax, polypropylene wax, ester wax, metal soap such as calcium stearate, zinc stearate, amide wax or a composite of them. Such particles have a melting point of 80 to 300° C. or can be a crosslinking substance not having a melting point. The wax used in the invention is a generic name for substances which contain a long hydrocarbon chain and have a viscosity which drops sharply at a certain temperature, and wax containing a paraffin chain having at least 10 or more carbon numbers in the hydrocarbon chain is suitable for the present invention.

As the inorganic microparticles (C) used in the invention, there are used microparticles formed of one element or a mixture of a metal oxide selected from silica, alumina, titania, bentonite, montmorillonite and the like, a metal nitride such as aluminum nitride and boron nitride, a metal carbide such as silicon carbide, a metal sulfate such as barium sulfate and calcium sulfate, calcium carbonate, a sulfide such as carbon disulfide and the like, a fluoride such as fluorite, carbon fluoride and the like, and they have a primary volume-average particle diameter of 5 to 1000 nm. Particles having a particle diameter of 100 nm or less are generally measured as having a particle diameter containing aggregated particles. Such primary average particle diameters could be present in a state adhered to the surfaces of the composite particles (A), so that the particle diameter in an actually used state is measured according to an electron microscope image of the particle surface.

The composite particles (A) are obtained by blending as the matrix a resin or the solid polymer particles (B) and the inorganic microparticles (C) at a desired ratio, and mixing by a Henschel mixer, a sand grinder a beads mill, an attritor, a ball mill, a kneader, a roll mill, a biaxial kneader, a tornade mill, a jet mill, a pin mill, a mechanical mill, or the like at a high speed under a strong shearing force and a desired temperature or below. By mixing as described above, the composite particles (A) having the inorganic particles uniformly coated on the surfaces of resin particles or wax particles can be obtained.

In the above mixing process, the microparticles are generated due to crushing and abrasion of the solid polymer particles (B), and the inorganic microparticles are further adhered to their surfaces, so that the particle diameter of the composite particles (A) can be adjusted relatively easily by selecting the mixing conditions. The composite particles (A) obtained through the above mixing process mostly have the surfaces substantially coated with the inorganic microparticles (C). But for example, composite particles which are produced by recombination of abrasion powder also have the inorganic microparticles in the composite particles.

The composite particles (A) obtained as described above are adjusted o a desired grain size through a classification process and added into the printing ink. For addition into the ink, any method such as a method of adding directly into the printing ink, a method of preliminarily mixing within the vehicle of the printing ink to prepare a paste in advance and adding the paste into the ink in the ink production process can be used, and a good result can be obtained regardless of whichever method is used for adding. The addition of the composite particles to the printing ink can be performed by a kneader, a roll mill, a beads mill or the like.

The printing ink composition of the present invention improved considerably the piling property at the time of printing, which was a problem when conventional solid polymer particles were added, and provides an excellent printed material keeping the abrasion resistance on the printed surface during and after printing.

The surfaces of the solid polymer particles (B) are coated with the inorganic microparticles (C), so that affinity with the ink vehicle is good, and a hickey phenomenon or the like is not caused.

In addition, even when particles having a high melting point are used as the solid polymer particles (B), they can be made fine to a volume-average particle diameter of 2 to 8 µm by the action of the inorganic microparticles (C).

And, the composite microparticles (A) do not degrade the transparency and glossiness of a printed material because their addition in a small amount into the ink vehicle provides a significant slip property improvement effect.

BEST MODE FOR CARRYING OUT THE INVENTION

Examples of the present invention will be described below. In the individual examples, the composite particles (A) added into a printing ink are simply referred to as composite particles.

Example 1

To 100 weight parts of an offset rotary press printing ink was blended 2 weight parts of the following composite particles I, and they were mixed by a three-roll mill to produce an ink 1.

Composite particles I: the composite particles I have 10 weight parts of silica powder having a primary volume-average particle diameter of 10 nm contained in 100 weight parts of polyethylene oxide particles having a melting point of 135° C. and an acid value of 30. The composite particles I have a volume-average particle diameter of 5 µm and contain 0.5 vol. % of particles having a particle diameter of 10 µm or more.

Example 2

To 100 weight parts of an offset rotary press printing ink was blended 2 weight parts of the following composite particles II, and they were mixed by a three-roll mill to produce an ink 2.

Composite particles II: the composite particles II have 30 weight parts of silica powder having a primary volume-average particle diameter of 10 nm contained in 100 weight parts of polyethylene particles having a melting point of 135° C. The composite particles II have a volume-average particle diameter of 3 µm and do not contain particles having a particle diameter of 10 µm or more.

Example 3

To 100 weight parts of a heat-set type sheet offset printing ink was blended 2 weight parts of the following composite particles III, and they were mixed by a three-roll mill to produce an ink 3.

Composite particles III: the composite particles III have 20 weight parts of alumina powder having a primary particle diameter of 10 nm and 10 weight parts of bentonite powder having a primary particle diameter of 1000 nm contained in spherical polyethylene oxide particles (a sphericity of 0.8 or more, and a needle penetration degree of smaller than 1.0 at 25° C.) having a melting point of 140° C. and an acid value of 30. The composite particles III have an average particle diameter of 8 μm and contain 4 vol. % of particles having a particle diameter of 10 μm or more. The "sphericity" expresses the polyethylene particles in a minor-to-major-axis ratio based on their projection image, and the "needle penetration degree" expresses a penetrated depth of a needle into a sample film under a load of 100 g at 25° C. for 5 seconds on the unit quantity of $10^{-1}$ mm according to JIS K-2235-5.4.

Example 4

To 100 weight parts of a heat-set type offset rotary press ink was blended 1.5 weight parts of the following composite particles IV, and they were mixed by a three-roll mill to produce an ink 4.
Composite particles IV: the composite particles IV have 100 weight parts of amide wax particles having a melting point of 135° C. coated with 30 weight parts of silica powder having a primary volume-average particle diameter of 10 nm. The composite particles IV have a volume-average particle diameter of 5 μm and do not contain particles having a particle diameter of 10 μm or more.

Example 5

To 100 weight parts of a heat-set type aqueous gravure ink were blended 1 weight part each of the following composite particles V and the composite particles I of Example 1, and they were mixed by a three-roll mill to produce an ink 5.
Composite particles V: the composite particles V have 100 weight parts of polypropylene particles having a melting point of 135° C. coated with 30 weight parts of silica powder having a primary volume-average particle diameter of 10 nm. The composite particles V have a volume-average particle diameter of 5 μm and contain 0.5 vol. % of particles having a particle diameter of 10 μm or more.

Example 6

To 100 weight parts of a heat-set type offset rotary press ink was blended 2 weight parts of the following composite particles VI, and they were mixed by a three-roll mill to produce an ink 6.
Composite particles VI: the composite particles VI have 10 weight parts of talc powder having a primary volume-average particle diameter of 500 nm contained in 100 weight parts of polyethylene particles having a melting point of 125° C. The composite particles have a volume-average particle diameter of 5 μm and do not contain particles having a particle diameter of 10 μm or more.

Example 7

To 100 weight parts of a heat-set type offset rotary press ink was blended 2 weight parts of the following composite particles G, and they were mixed by a three-roll mill to produce an ink 7.
Composite particles VII: the composite particles VII have 30 weight parts of silica powder having a primary volume-average particle diameter of 10 nm contained in 100 weight parts of polytetrafluoroethylene particles having a melting point of 310° C. The composite particles have a volume-average particle diameter of 3 μm and do not contain particles having a particle diameter 10 μm or more.

Comparative Example 1

To 100 weight parts of a heat-set type offset printing ink was mixed 2 weight parts of polypropylene particles having a melting point of 130° C., a volume-average particle diameter of 9.0 μm and containing 7 vol. % of particles having a particle diameter of 10 μm or more to produce an ink 8.

Comparative Example 2

To 100 weight parts of a heat-set type offset printing ink was mixed 2 weight parts of polyethylene particles having a melting point of 110° C., a volume-average particle diameter of 8.0 μm and containing 10 vol. % of particles having a particle diameter of 10 μm or more to produce an ink 9.

Comparative Example 3

To 100 weight parts of a heat-set type offset printing ink was mixed 4 weight parts of polyethylene particles having a melting point of 140° C., a volume-average particle diameter of 6.0 μm and containing 6 vol. % of particles having a particle diameter of 10 μm or more to produce an ink 10.
The inks obtained in the individual Examples and Comparative Examples were used to print samples by an offset printing machine or a gravure printing machine. The samples were dried at a hot air temperature of 200° C. and a paper surface temperature of 120° C., and the test results are shown in Table 1.

TABLE 1

| | Piling resistance property | Abrasion test results On printing machine | Printed material | Printed material gloss |
|---|---|---|---|---|
| Example 1 | ○ | ○ | 4 | 57.2 |
| Example 2 | ○ | ○ | 5 | 58.3 |
| Example 3 | ○ | ○ | 5 | 58.5 |
| Example 4 | ○ | ○ | 3 | 58.0 |
| Example 5 | ○ | ○ | 4 | 55.4 |
| Example 6 | ○ | ○ | 5 | 56.2 |
| Example 7 | ○ | ○ | 5 | 54.5 |
| Comparative Example 1 | X | X | 2 | 50.3 |
| Comparative Example 2 | X | Δ | 2 | 50.1 |
| Comparative Example 3 | X X | X | 1 | 49.5 |

The test results each in the table were obtained by measuring according to the following methods.
Piling property: Ten thousand sheets were printed by an offset printing machine or a gravure printing machine. Then, evaluation was made on the basis of the presence of deposits and stained levels on the surfaces of the form plate, the blanket and the inking roll. Deterioration of the printed surface due to deposition of the solid polymer is indicated by X, no deposition of the solid polymer with the retention of the printed surface with the same image quality as that of the initial printing is indicated by O, and an intermediate between them is indicated by Δ.
Abrasion resistance of printing machine: Scratched levels of the guide rolls and the former during printing were compared no scratch is indicated by O, occurrence of conspicuous scratches is indicated by X, and an intermediate between them is indicated by Δ.

Abrasion resistance of printed material: A solid printed area printed on an art white paper surface was abraded by a Toyo Seiki rubbing tester (Gakushin Type) under conditions of a load of 100 g and 10 reciprocating operations. Then, five-grade evaluation (Good 5 to Poor 1) was performed on deterioration levels of images due to abrasion.

Glossiness: The solid printed surface after drying was evaluated according to a ratio between an incident light intensity at an incident angle of 60 degrees and a reflection light intensity at a reflection angle of 60 degrees.

INDUSTRIAL APPLICABILITY

The present invention is suitable as a variety of types of printing ink compositions, and particularly as an offset rotary press printing ink.

What is claimed is:

1. A printing ink composition which is used in a printing ink, the printing ink composition comprising composite particles (A), wherein each of the composite particles (A) comprises:
   a solid polymer particle (B) formed of a wax or a mixture of a resin and the wax and insoluble in the printing ink; and
   inorganic particles (C) having an average particle diameter of 5 to 1000 nm;
   wherein the composite particles (A) have a volume-average particle diameter in a range of 2 to 8 μm in which a volume content of solid polymer particles having a particle diameter of exceeding 10 μm is 5 vol. % or less; and
   wherein each of the composite particles (A) is formed to cover substantially the surfaces of the solid polymer particle (B) with the inorganic microparticles (C); and
   wherein said wax has a melting point of 125° C. or more and a needle penetration degree of 1.0 or less at 25° C.

2. The printing ink composition according to claim 1, wherein the inorganic particles (C) are formed of at least one or a mixture of metal oxide, metal nitride, metal carbide, metal sulfate, sulfide and fluoride.

3. The printing ink composition according to claim 1, wherein said wax is polyethylene oxide wax having an acid value of 10 or more.

4. The printing ink composition according to claim 1, wherein said wax has a melting point of 135° C. or more.

5. A printing ink composition which is used in a printing ink, the printing ink composition comprising composite particles (A), wherein each of the composite particles (A) comprises:
   a solid polymer particle (B) formed of a wax or a mixture of a resin and the wax and insoluble in the printing ink; and
   inorganic particles (C) having an average particle diameter of 5 to 1000 nm;
   wherein the composite particles (A) have a volume-average particle diameter in a range of 2 to 8 μm in which a volume content of solid polymer particles having a particle diameter of exceeding 10 μm is 5 vol. % or less;
   wherein the composite particles (A) contain the inorganic microparticles (C) in a range of 0.5 to 50 weight parts with respect to 100 weight parts of the solid polymer particles (B); and
   wherein each of the composite particles (A) is formed to cover substantially the surfaces of the solid polymer particle (B) with the inorganic microparticles (C); and
   wherein said wax has a melting point of 125° C. or more and a needle penetration degree of 1.0 or less at 25° C.

6. The printing ink composition according to claim 5, wherein the inorganic particles (C) are formed of at least one or a mixture of metal oxide, metal nitride, metal carbide, metal sulfate, sulfide and fluoride.

7. The printing ink composition according to claim 5, wherein the solid polymer particles (B) are polyethylene oxide wax having a melting point of 120° C. or more and an acid value of 10 or more.

8. The printing ink composition according to claim 5, wherein said wax has a melting point of 135° C. or more.

9. A printing ink composition which is used in a printing ink, the printing ink composition comprising composite particles (A), wherein each of the composite particles (A) comprises:
   a solid polymer particle (B) formed of a wax or a mixture of a resin and the wax and insoluble in the printing ink; and
   inorganic particles (C) having an average particle diameter of 5 to 1000 nm;
   wherein the composite particles (A) have a volume-average particle diameter in a range of 2 to 8 μm in which a volume content of solid polymer particles having a particle diameter of exceeding 10 μm is 5 vol. % or less;
   wherein the composite particles (A) contain the inorganic microparticles (C) in a range of 0.5 to 50 weight parts with respect to 100 weight parts of the solid polymer particles (B);
   wherein the solid polymer particles (B) are polyethylene oxide wax having a melting point of 125° C. or more, a needle penetration degree of 1.0 or less at 25° C. and an acid value of 10 or more; and
   wherein each of the composite particles (A) is formed to cover substantially the surface of the solid polymer particle (B) with the inorganic microparticles (C).

10. The printing ink composition according to claim 9, wherein said wax has a melting point of 135° C. or more.

* * * * *